(12) United States Patent
Narasimhan

(10) Patent No.: US 8,488,442 B1
(45) Date of Patent: *Jul. 16, 2013

(54) COMPENSATION FOR RESIDUAL FREQUENCY OFFSET, PHASE NOISE AND I/Q IMBALANCE IN OFDM MODULATED COMMUNICATIONS

(75) Inventor: Ravishanker Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 146 days.

This patent is subject to a terminal disclaimer.

(21) Appl. No.: 13/010,295

(22) Filed: Jan. 20, 2011

Related U.S. Application Data

(63) Continuation of application No. 12/645,678, filed on Dec. 23, 2009, now Pat. No. 7,881,237, which is a continuation of application No. 12/287,199, filed on Oct. 7, 2008, now Pat. No. 7,643,405, which is a continuation of application No. 10/316,806, filed on Dec. 10, 2002, now Pat. No. 7,433,298.

(60) Provisional application No. 60/404,655, filed on Aug. 19, 2002.

(51) Int. Cl.
    *H04J 11/00* (2006.01)
(52) U.S. Cl.
    USPC .......................................... 370/210; 370/280
(58) Field of Classification Search
    CPC ............ H04L 25/03343; H04L 27/3863; H04L 2025/03414; H04L 2025/03802; H04W 24/00
    USPC .................. 370/206, 208, 210, 465
    See application file for complete search history.

(56) References Cited

U.S. PATENT DOCUMENTS 5,949,821 A 9/1999 Emami et al.
6,035,003 A 3/2000 Park et al.
(Continued)

FOREIGN PATENT DOCUMENTS

WO WO 01/80509 A1 10/2001
WO WO 02/23844 A1 3/2002
WO WO 02/45387 A2 6/2002

OTHER PUBLICATIONS

IEEE std 802.16-2004, (Revision of IEEE std, 802.16-2001), IEEE Standard for Local and metropolitan area networks, Part 16; Air Interface for Fixed Broadband Wireless Access Systems, IEEE Computer Society and the IEEE Microwave Theory and Techniques Society, Sponsored by the LAN/MAN Standards Committee, 893 pages.

(Continued)

*Primary Examiner* — Jung Park

(57) ABSTRACT

A method including downconverting an analog radio frequency signal into an analog baseband signal; recovering an analog in-phase signal and an analog quadrature signal from the analog baseband signal; converting the analog in-phase signal into a corresponding digital in-phase signal; converting the analog quadrature signal into a corresponding digital quadrature signal; compensating the digital in-phase signal and the digital quadrature signal; converting the compensated digital in-phase signal and the compensated digital quadrature signal into a frequency domain digital Orthogonal Frequency Division Multiplexing (OFDM) symbol; generating a plurality of channel estimates, wherein each channel estimate corresponds to an estimate of the channel for a corresponding sub-carrier of the frequency domain digital OFDM symbol; and generating (i) a most likely estimate of the imbalance between the digital in-phase signal and the digital quadrature signal and (ii) a most likely estimate of a common phase error in the plurality of channel estimates.

9 Claims, 5 Drawing Sheets

U.S. PATENT DOCUMENTS

| | | | |
|---|---|---|---|
| 6,097,776 | A | 8/2000 | Mesiwala |
| 6,363,084 | B1 | 3/2002 | Dejonghe |
| 6,414,936 | B1 | 7/2002 | Cho et al. |
| 6,549,561 | B2 | 4/2003 | Crawford |
| 6,892,060 | B2 | 5/2005 | Zheng |
| 6,950,483 | B2 | 9/2005 | Chiodini |
| 7,012,882 | B2 | 3/2006 | Wang et al. |
| 7,020,226 | B1 | 3/2006 | Kirkland |
| 7,088,672 | B2 | 8/2006 | Kim |
| 7,433,298 | B1 | 10/2008 | Narasimhan |
| 2004/0028123 | A1* | 2/2004 | Sugar et al. ............ 375/224 |
| 2008/0212711 | A1* | 9/2008 | Auranen et al. ......... 375/295 |

OTHER PUBLICATIONS

IEEE std. 802.11a-1999, Sponsor LAN MAN Standards Committee of IEEE Computer Society, "Part 11: Wireless LAN Medium Access Control (MAC) and Physical Layer (PHY) Specifications, High-Speed Physical Layer Extension in the 5 GHz Band," Sep. 1999, pp. 1-83.

International Standard, ANSI/IEEE std. 802.11, first edition, Sponsor LAN MAN Standards IKHI Committee of IEEE Computer Society, "Part 11: Wireless LAN Medium Access Control (MAC) and Physical Layer (PHY) specifications," 1999.

IEEE P802.16a/D2-2002, Sponsor LAN MAN Standards Committee of IEEE Computer Society, "Local and Metropolitan Area Networks—Part 16: Air Interface for Fixed Broadband Wireless Access Systems," Feb. 7, 2002, pp. 1-253.

LAN/MAN Standards Committee of the IEEE Computer Society (May 2002). "DRAFT Supplement to STANDARD (for) Information Technology—Telecommunications and Information Exchange Between Systems—Local and Metropolitan area Networks—Specific Requirements—Part 11: Wireless LAN Medium Access Control (MAC) and Physical Layer (PHY) Specifications: Further Higher-Speed Physical Layer Extension in the 2.4 GHz Band," IEEE Std. 802.11g/D2.8 (Supplement to ANSIIEEE Std. 802.11, 1999 Edition) 48 pages total.

* cited by examiner

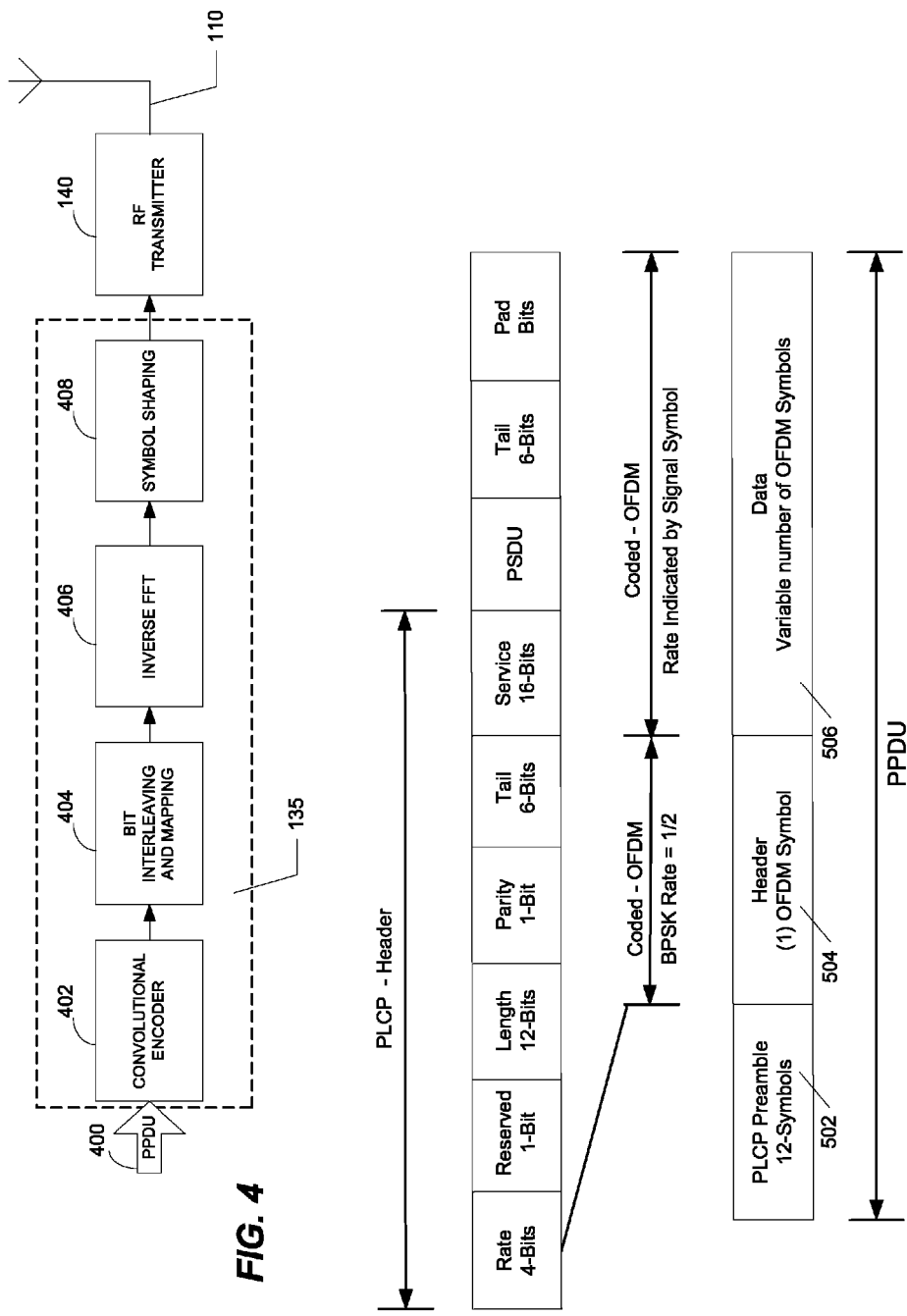

COMPENSATION FOR RESIDUAL FREQUENCY OFFSET, PHASE NOISE AND I/Q IMBALANCE IN OFDM MODULATED COMMUNICATIONS

RELATED APPLICATIONS

This application is a continuation of U.S. patent application Ser. No. 12/645,678 (now U.S. Pat. No. 7,881,237), filed Dec. 23, 2009, which is a continuation of U.S. patent application Ser. No. 12/287,199 (now U.S. Pat. No. 7,643,405), filed Oct. 7, 2008, which is a continuation of U.S. patent application Ser. No. 10/316,806 (now U.S. Pat. No. 7,433,298), filed Dec. 10, 2002, which claims priority benefit under 35 U.S.C. §119(e)(1) to U.S. Provisional Application No. 60/404,655, filed Aug. 19, 2002. The disclosures of the above applications are incorporated herein by reference in their entirety.

TECHNICAL FIELD

The invention generally relates to symbol modulated communication techniques, and more particularly, to a method and apparatus which improves reception performance of OFDM modulated signals through compensating for at least one of residual frequency offset, phase noise and I/Q imbalance in the received baseband signal.

BACKGROUND

The past few years has witnessed the ever-increasing availability of relatively cheap, low power wireless data communication services, networks and devices, promising near wire speed transmission and reliability. One technology in particular, described in the IEEE Standard 802.11a (1999) and Draft IEEE Standard 802.11g (2002) High Rate PHY Supplements to the ANSI/IEEE Standard 802.11, 1999 edition, collectively incorporated herein fully by reference, has recently been commercialized with the promise of 54 Mbps effective bandwidth, making it a strong competitor to traditional wired Ethernet and the more ubiquitous "802.11b" or "WiFi" 11 Mbps mobile wireless transmission standard.

IEEE 802.11a and 802.11g or "802.11a/g" compliant transmission systems achieve their high data transmission rates through using Orthogonal Frequency Division Modulation or OFDM encoded symbols mapped up to 64 QAM multicarrier constellation and beyond. Generally, OFDM works generally by dividing one high-speed data carrier into multiple low speed sub-carriers which are used for transmission of data in parallel. Put another way, the data stream of interest is divided into multiple parallel bit streams, each transmitted over a different sub-carrier having a lower effective bit rate. Before final power amplification and transmission, the multicarrier OFDM symbol encoded symbols are converted into the time domain using Inverse Fast Fourier Transform techniques resulting in a relatively high-speed time domain signal with a large peak-to-average ratio (PAR). OFDM is also used in fixed broadband wireless access systems such as proposed in IEEE Standard 802.16a: Air Interface for Fixed Broadband Wireless Access Systems Part A: Systems between 2 and 1 GHz, Draft working document, February 2002, ("802.16a") which is incorporated herein fully by reference.

In the case of 802.11a and 802.11g, there are up to 52 defined subcarriers, of which 48 are available to carry data (4 remaining are pilot sub-carriers or tones, which bear predetermined data). These sub-carriers are substantially orthogonal to each other, so they can be spaced closer together than in conventional frequency division multiplexing. Mathematically, the integral of the product of any two orthogonal sub-carriers is zero. This property allows the separating of sub-carriers at the receiver without interference from other sub-carriers.

In wireless OFDM communications systems, residual frequency offset and phase noise can impact Bit Error Rate performance, and ultimately reception performance in OFDM compliant wireless communications due to a loss of sub-carrier orthogonality. Reception performance, and ultimately throughput and range of an OFDM system is further limited by imbalance of the I and Q components of the analog baseband signal recovered from the inbound RF signals bearing the OFDM modulated data of interest. It is, therefore, advantageous if an OFDM compliant receiver and receiving techniques could be provided to account and compensate for such effects and improve overall reception performance, including range and effective throughput in less than ideal conditions.

SUMMARY OF THE INVENTION

To address these and other perceived shortcomings, the present invention is directed to baseband signal processing methods and apparatus which incorporate I/Q imbalance compensation based on most likely estimates of the I/Q imbalance between the I and Q components of the baseband signal. Further, in accordance with at least one disclosed embodiment of the invention, most likely estimates of the common phase error (CPE) may be used to compensate the initial channel estimates to further improve symbol demodulation rates and overall receiver performance.

Though applicable to any multicarrier OFDM communications system, methods and apparatus consistent with the present invention may be conveniently implemented in IEEE 802.11a, IEEE 802.11g, or 802.16a compliant wireless communications systems to reduce the effects of imbalanced I/Q components of baseband signals bearing packets or frames of OFDM symbols of data recovered from inbound RF signals, as well as counter residual frequency offset and phase noise potentially present in such baseband signals Additional aspect features and advantages of this invention will become apparent from the following detailed description of embodiments thereof, which proceeds with reference to the accompanying drawings, in which like reference numerals indicate like parts or features.

BRIEF DESCRIPTION OF THE DRAWINGS

FIG. 4 is a more detailed block diagram of the transmitter shown in FIG. 1.

FIG. 5 is a diagram of an OFDM PPDU frame.

DETAILED DESCRIPTION OF THE EMBODIMENTS

Figure 1:
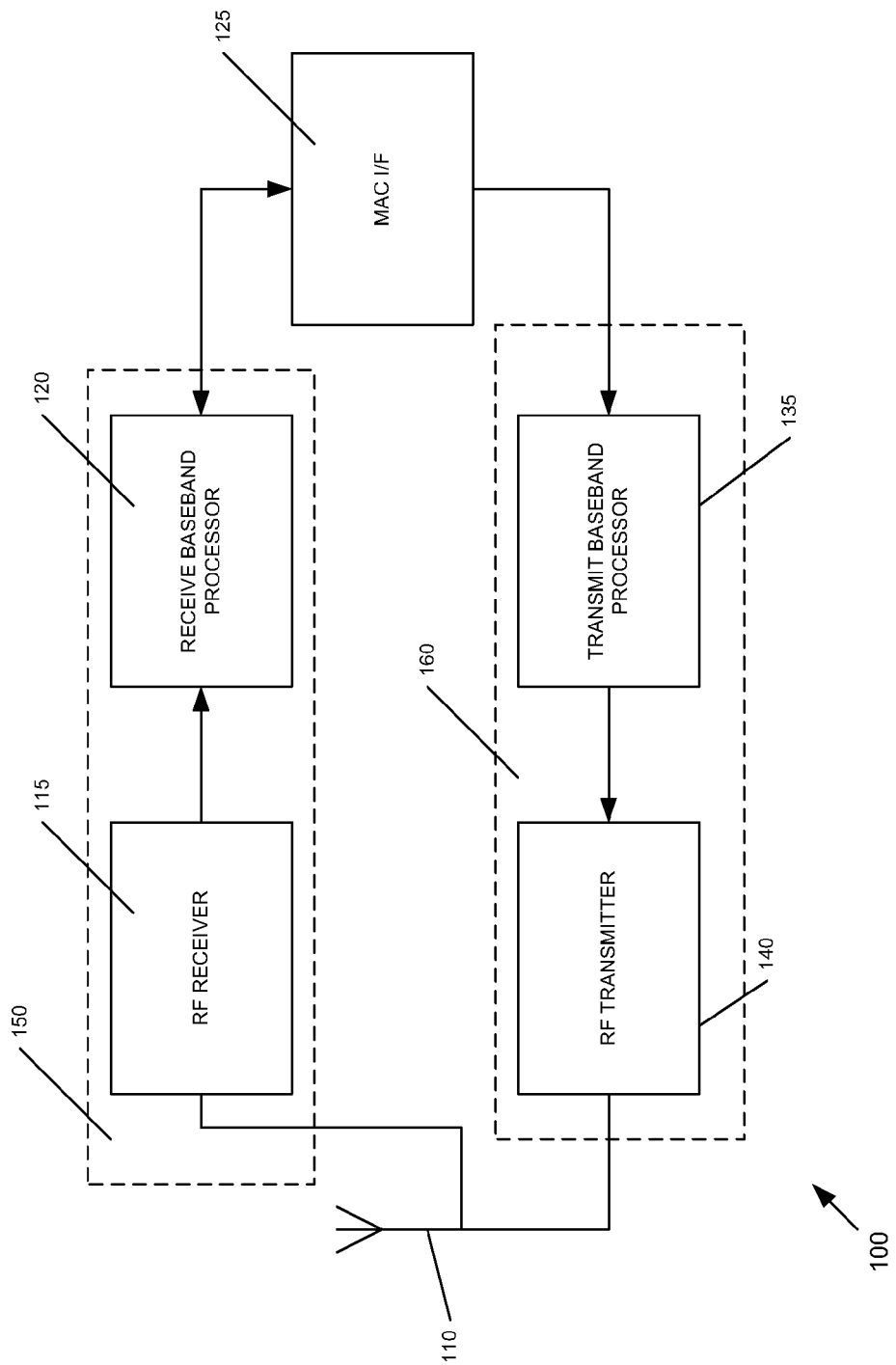
FIG. 1 is a simplified functional block diagram of a transceiver according to an embodiment of the present invention.
Figure 2:
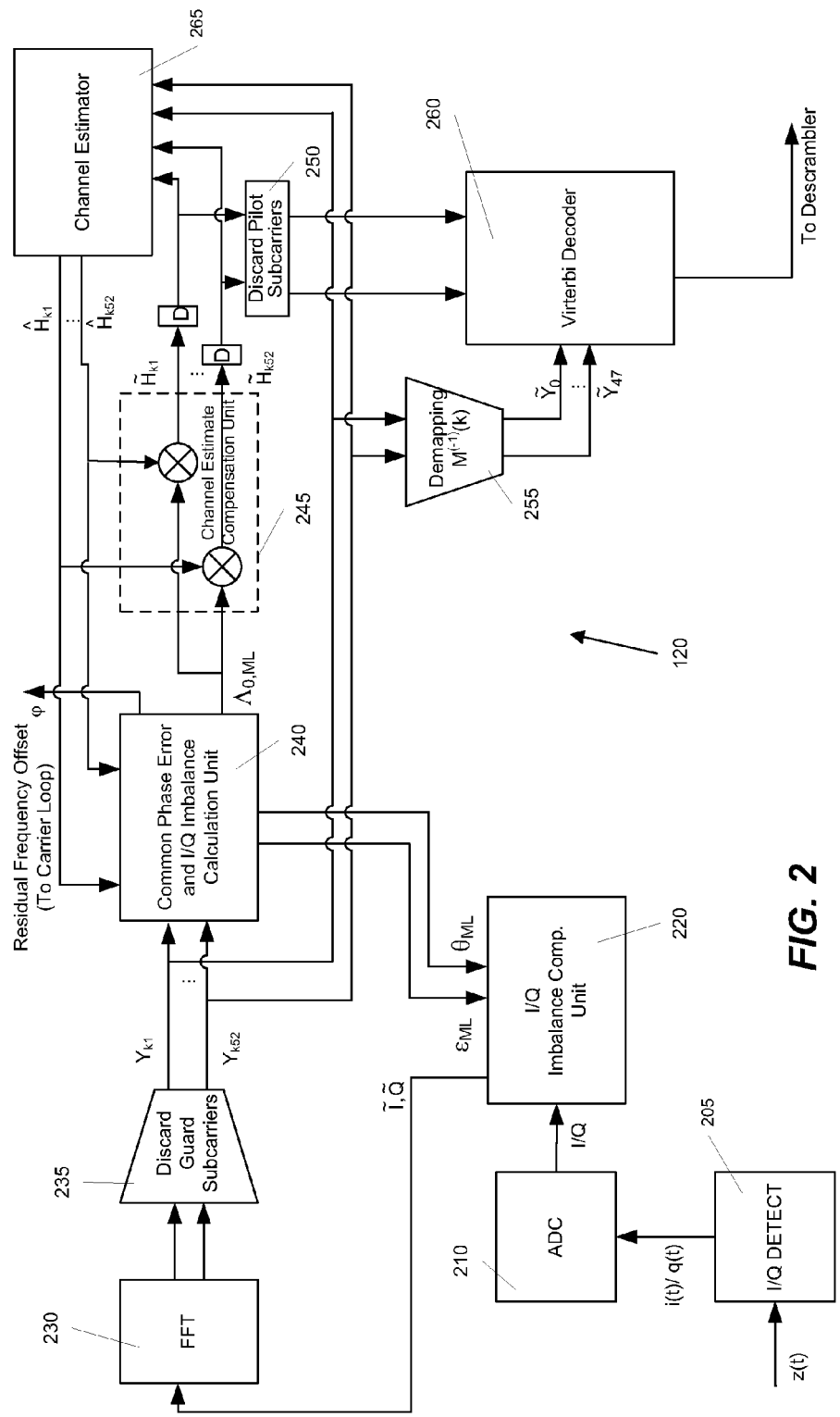
FIG. 2 is a functional block diagram of the receive baseband processing unit shown in FIG. 1.

FIG. 1 illustrates a wireless communications transceiver 100 according to an embodiment of the present invention, including the receiver baseband processing unit shown in FIG. 2. In this embodiment, inbound RF signals conveying a 802.11a/g or 802.16a compliant frame of OFDM encoded symbols are picked up by the duplex antenna 110 and routed to the RF receiver unit 115 of a receiver 150 arranged in a manner consistent with the present invention. The RF receiver unit 115 performs routine downconversion and automatic gain control of the inbound RF signals, and presents an analog baseband signal containing at least one frame of 802.11a/g OFDM symbols to the receive baseband processing unit or processor 120. Generally speaking, the receive baseband processing unit or processor 120 performs symbol demodulation of the each inbound 802.11a/g compliant frame to recover bitstream data for receiver synchronization (preamble), frame or packet definition (header), or the actual inbound data of interest (payload). Consistent with the present invention, this processor 120 includes I/Q imbalance and common phase error compensation consistent with the present invention, as will be described in more detail below.

Once recovered by the receive baseband processor 120, the inbound data contained in each received 802.11a/g formatted frame is delivered to a network interface such as the MAC layer interface 125 and then on to higher layer applications and devices being serviced by the transceiver 100. Outbound data intended for wireless transmission originating from the device(s) or application(s) being serviced by the transceiver 100 are delivered to the transmit baseband processor 135 of the transmitter 160 from the MAC interface 125. The transmit baseband processor 135 formulates appropriate 802.11a/g frame preamble and header information, and OFDM symbol encodes the outbound data to generate one or more complete outbound 802.11a/g frames. As the frame or packet is being developed, it is converted into analog form suitable for upconversion and RF transmission by the RF transmitter unit 140 consistent with well-known 802.11a/g physical layer requirements.

Though only a single duplex antenna arrangement is shown in FIG. 1, the transceiver 100 can be easily adapted to incorporate multiple receive pathways or chains to take advantage of selection diversity or MRC diversity techniques. Likewise, though not shown in FIG. 1, transmit diversity techniques may be employed in addition or in the alternative as would be understood by those skilled in the art.

Also, though not shown in FIG. 1, the transceiver 100 may form an operational part of a network interface apparatus such as a PC card or network interface card capable of interfacing with the CPU or information processor of an information processing apparatus such as a desktop or laptop computer, and may be integrated within and constitute a part of such information processing apparatus. This network interface apparatus may alternatively fowl an operational component of a wireless communications access point such as a base station as will be appreciated by these ordinarily skilled in the art.

FIG. 4 is a more detailed block diagram of the transmitter 140, which includes an OFDM PMD compliant with the IEEE 802.11a/g standards. In FIG. 4, an outbound PPDU 400, i.e. a data unit is provided to the input of the transmit baseband processor 135 from the MAC interface 125 (FIG. 1). This data unit, described in greater detail below, has a preamble, a header, data portion, tail, pad bits etc. The data unit bit stream is input to a convolutional encoder 402. The information preferably is encoded using convolutional encoding rate R=1/2, 2/3, or 3/4 depending on the specified data rate, and using known polynomials.

Next the encoded data is input to bit interleaving and mapping block 404. Bit interleaving is accomplished by a block interleaver with a block size corresponding to the number of bits in a single OFDM symbol, NCBPS, as detailed in e.g. the IEEE 802.11a standard (1999) at section 17.3.5.6. The first permutation ensures that adjacent coded bits are mapped onto nonadjacent sub-carriers. The second permutation step ensures that adjacent coded bits are mapped alternately onto less and more significant bits of the constellation and, thereby, long runs of low reliability (LSB) bits are avoided.

Block 404 in FIG. 1 also represents mapping or symbol modulating the data. The encoded and interleaved binary serial input data is divided into groups of bits, each group sized according to the selected modulation (1, 2, 4 or 6 bits). For example, 64-QAM modulation maps 6-bit quantities onto the constellation. The same procedures can be extended to higher rate encoding, beyond the 802.11a/g standards, such as 256-QAM as proposed in e.g. IEEE 802.16a, in which case each group of 8 bits of the serial data is mapped onto one complex number (I+jQ) corresponding to a location on the 256-QAM constellation. The output values are multiplied by a normalization factor, depending on the base modulation mode (for 64-QAM, it is $1/\sqrt{42}$) to achieve the same average power for all mappings.

Each group of 48 complex numbers is associated with one OFDM symbol. Thus 48×6=288 data bits are encoded per OFDM symbol in the case of 64-QAM constellation bit encoding. The symbol duration is 4.0 μsec. Each group of 48 numbers is mapped to a corresponding one of 48 useful sub-carriers, frequency offset index numbers −26 to +26. Accordingly each sub-carrier (except the pilot sub-carriers) will be modulated by one complex number for each OFDM symbol in the current data unit.

In each symbol, four of the sub-carriers are dedicated to pilot signals to assist in coherent detection. They are also used in the accordance with the present invention in compensating for I/Q imbalance in the digital I and Q components of the inbound baseband signal and as well as in compensating for common phase error in the initial channel estimates. The pilot signals are put in sub-carriers −21, −7, 7 and 21 according to the IEEE 802.11a/g standards. The pilots are BPSK modulated by a pseudo binary sequence to prevent the generation of spectral lines.

The inverse FFT 406 receives all 52 sub-carrier signals and combines them to form a time domain digital signal. Next, a guard interval (not shown) is inserted. The guard interval is to increase immunity to multipath by extending the length of the transmitted symbol. (It is also known as CP or cyclic prefix.) The window length used in the baseband processor in the receiver to decode the symbol is that of the active symbol length, in other words excluding the guard interval period. Symbol wave shaping follows in block 408. Then modulation onto in-phase I and quadrature-phase Q carriers is performed and the combined signal is modulated onto the radio frequency carrier fc for transmission (via RF transmitter 140). To summarize mathematically, as noted above, the transmitted time-domain signal x(t) (after D/A conversion at rate 1/T) is represented by $$x(t) = \frac{1}{N} \sum_{k=0}^{N-1} X_k \, e^{j\frac{2\pi kt}{NT}} \tag{1}$$

where $X_k$ are the frequency-domain data symbols. In other words, the N values $X_k$ represent the respective values of the discretely-varying (e.g. QPSK or QAM) signals modulating the OFDM carriers.

Before describing the receiver 150 of the transceiver 100, we examine more closely the structure of the data unit frame and how it is designed to assist the receiver 150 in perceiving and decoding inbound OFDM packets or frames. FIG. 5 is a block diagram illustrating the structure of a PLCP protocol data unit (PPDU) frame, in accordance with the IEEE 802.11a standard, and is similar to the 20 Mbps+ rate PPDU frame format for IEEE 802.11g. In particular, this frame structure is a part of the IEEE 802.11a physical layer extension to the basic 802.11 protocol. The 802.11a extension defines requirements for a PHY operating in the 5.0 GHz unlicensed frequency bands and data rates ranging from 6 Mbps to 54 Mbps.

Under this protocol, the PPDU (PLCP protocol data unit) frame consists of a PLCP preamble and signal and data fields as illustrated in FIG. 5. The receiver 150 uses the PLCP preamble to acquire the incoming OFDM signal and synchronize the baseband processor 120. The PLCP header contains information about the PSDU (PLCP service data unit containing data of interest) from the sending OFDM PHY. The PLCP preamble and the signal field are always transmitted at 6 Mbps, binary phase shift keying (BPSK), modulated using convolutional encoding rate R=½.

The PLCP preamble 502 is used to acquire the incoming signal and train and synchronize the receiver 150. The PLCP preamble consists of 12 symbols, 10 of which are short symbols, and 2 long symbols. The short symbols are used to train the receiver's AGC (not shown) and obtain a coarse estimate of the carrier frequency and the channel. The long symbols are used to fine-tune the frequency and channel estimates. Twelve sub-carriers are used for the short symbols and 52 for the long symbols. The training of an 802.11a compliant OFDM receiver, such as receiver 150, is accomplished in 16 μsec. This is calculated as 10 short symbols times 0.8 μsec each, plus 2 long training symbols at 3.2 μsec each, plus the guard interval. See e.g. IEEE standard 802.11a (1999) section 17.3.3. These training symbols, as noted above, provide for initial channel and frequency offset estimation, but do not compensate for other factors such as sampling frequency jitter.

Referring still to FIG. 5, the preamble field 502 is followed by a signal field 504 which consists of one OFDM symbol. This contains the rate and length fields as requested by the MAC interface 125. The rate field conveys information about the type of modulation and the coding rate as used in the rest of the packet. The encoding of the SIGNAL single OFDM symbol is performed with BPSK modulation of the sub-carriers and again using convolutional coding at R=½. The SIGNAL field is composed of 24 bits, with bits 0 to 3 encoding the rate, bit 4 reserved, and bits 5-16 encoding the length of the packet, with the LSB being transmitted first. A single parity bit and 6-bit tail field complete the SIGNAL symbol. Finally, the SIGNAL field 504 is followed by the data 506 comprising a variable number of OFDM symbols including the SERVICE field still forming part of the PLCP Header, consistent with the length specified in the SIGNAL field 504.

As mentioned previously in discussing FIG. 1, the receiver 150 includes an RF receiver unit 115 to receive, downconvert and gain condition inbound RF signals to present an analog baseband signal to the receive baseband processor 120. A more detailed view of the receive baseband processor 120 in accordance with an embodiment of the invention is illustrated in FIG. 2. Here, the recovered analog baseband signal z(t) is provided to the input of the I/Q detector 205 to recover analog in-phase (i) and quadrature-phase (q) signals, which are then fed to the analog to digital converter 210. The i and q signals are converted into their respective digital counterpart signal components I and Q, each bearing digital data in the time domain. Next, the I and Q components are sent to the I/Q imbalance compensation unit 220, where they undergo I/Q imbalance compensation using maximum likelihood estimates of the gain $\epsilon ML$ and phase $\theta ML$ imbalance calculated by the common phase error and I/Q imbalance calculation unit 240 for, e.g., the previously received OFDM symbol. Imbalance compensation according to this embodiment, including calculation of $\epsilon ML$ and $\theta ML$ will be described in more detail below with reference to equations 13-16. Imbalance compensated counterparts $\tilde{I}$ and $\tilde{Q}$ are obtained by the I/Q imbalance compensation unit 220 and sent to the FFT 230 for conversion into the frequency domain and recovery of the OFDM symbols present therein. In fact, the FFT 230 recovers the 52 subcarrier signals Yk1 . . . Yk52 forming each OFDM symbol borne by the time domain $\tilde{I}$ and $\tilde{Q}$ signals. At block 235, the guard interval subcarriers are discarded and the remaining subcarriers are then input to demapping block 255 and Viterbi decoder 260 for bit de-interleaving and de-mapping (from the e.g. 64 QAM constellation), as well as most likely sequence determination consistent with known Viterbi algorithms. The resulting serial binary stream then undergoes descrambling (not shown) to recover the inbound data of interest in proper sequence, as is known in the art.

It should be noted that, unlike conventional OFDM baseband processors, the baseband processor 120 utilizes common phase error compensated channel estimates in the OFDM demodulation and decoding process. In particular, a common phase error and I/Q imbalance calculation unit 240 is provided after the guard subcarrier discard block 235 to calculate the most likely estimate of the I/Q imbalance $\alpha ML$ and the most likely estimate of the common phase error $\Lambda 0,ML$ using the initial channel estimates $\hat{H}_{k1}$ . . . $\hat{H}_{k52}$ derived from the pilot subcarriers by the channel estimator 265 as well as the OFDM symbol bearing subcarriers Yk1 . . . Yk52 themselves on a per symbol basis. In turn, the imbalance estimate $\alpha ML$ is used to derive $\epsilon ML$ and $\theta ML$ for use in the I/Q imbalance compensation performed by the I/Q imbalance compensation unit 220, and the common phase error $\Lambda 0,ML$ estimate is multiplicatively applied to the channel estimates $\hat{H}_{k1}$ . . . $\hat{H}_{k52}$ by the channel estimate compensation unit 245. The resulting compensated channel estimates, $\tilde{H}_{k1}$ . . . $\tilde{H}_{k52}$ minus those specified for the pilot subcarriers which are unneeded for demodulation and Viterbi decoding, are provided to the Viterbi decoder 260 to provide more accurate recovery of the most likely sequence of transmitted data from the received OFDM symbol(s). These compensated channel estimates $\tilde{H}_{k1}$ . . . $\tilde{H}_{k52}$ are also provided to the channel estimator 265 to refine the channel estimates for subsequent OFDM symbol(s), if any, in the frame (adaptive channel estimation using common phase error compensation). Details as to calculating $\alpha ML$ and $\Lambda 0,ML$ will be discussed below with reference to equations (6)-(11), as will performance of common phase error compensation of the channel estimates with reference to e.g. equation (12) discussed below.

Obtaining the most likely estimates of the common phase error and I/Q imbalance, as well as channel estimate and I/Q imbalance compensation consistent with the present invention will now be discussed. Recalling equation (1), the transmitted signal x(t) is convolved with a multi-path channel with impulse response h(t). At the receiver (such as receiver 160 of the transceiver 100 shown in FIG. 1), residual frequency offset and phase noise contribute to a multiplicative distortion $e^{j\Phi(t)}$. Let $y(t)=e^{j\Phi(t)}[h(t)*x(t)]$, where * denotes convolution. The in-phase (I) and quadrature-phase (Q) components of y(t) are distorted by a gain imbalance of c and a phase imbalance of θ. Finally, white Gaussian noise v(t) is added to form the received baseband signal z(t):

$$z(t) = y(t)\left[\cos(\theta/2) + j\frac{\varepsilon}{2}\sin(\theta/2)\right] + y*(t)\left[\frac{\varepsilon}{2}\cos(\theta/2) + j\sin(\theta/2)\right] + v(t) \quad (2)$$

For $|\theta| \ll 1$ and $|\varepsilon| \ll 1$, $$z(t) \approx y(t) + y*(t)\left[\frac{\varepsilon}{2} - j\frac{\theta}{2}\right] + v(t) \quad (3)$$

Let $\Phi n$, yn, zn, vn denote the discrete-time versions of $\Phi(t)$, y(t), z(t), v(t), respectively, sampled at the rate 1/Ts. Let Yk, Zk, Vk denote the N-point FFT's of yn, zn, vn, respectively. Also, let $\alpha=(\varepsilon-j\theta)/2$, which represents the I/Q imbalance in the frequency domain, and $\Lambda k$, phase noise and residual frequency offset, denote the FFT of $e^{j\Phi n}$ (the residual frequency offset and phase noise in the frequency domain). The FFT output Zk is given by $$Z_k \approx Y_k + Y_{-k}^* \alpha + V_k = \frac{1}{N}\Lambda_0 H_k X_k + \frac{1}{N}\Lambda_0^* H_{-k}^* X_{-k}^* \alpha + W_k \quad (4)$$

where $$H_k = \int h(\tau) e^{-j\frac{2\pi k\tau}{NTs}} d\tau$$

is the FFT of the channel impulse response and $W_k$ represents intercarrier interference and noise (also known as Additive White Gaussian Noise or AWGN). The common phase error (CPE) is given by $\Lambda_o$. Let $A_k = H_k X_k/N$. Therefore, $$Z_k \approx \Lambda_0 A_k + \Lambda_0^* \alpha A_{-k}^* + W_k \quad (5)$$

Suppose that there are 2M pilot subcarriers (with subcarrier indeces $\pm k1 \ldots, \pm kM$) in every OFDM symbol. For example, in the IEEE 802.11a or draft 802.11g standards, there are 2M=4 pilot subcarriers symmetrically positioned in the constellation with indeces k=±7, ±21. These pilot subcarriers are used in this embodiment to estimate the common phase error $\Lambda o$ and the I/Q imbalance $\alpha$. Thus, Ak can be estimated for these pilot subcarriers by $\hat{A}_k = \hat{H}_k X_k/N$ where $\hat{H}_k$ are the estimates of Hk. The maximum likelihood estimates of $\Lambda o$ and $\alpha$ can be derived and are given by $$\Lambda_{o,ML} = \frac{c_1 r_2 - c_2^* r_1}{c_1^2 - |c_2|^2} \text{ and} \quad (6)$$

$$\alpha_{ML} = \frac{c_1 r_1 - c_2 r_2}{c_1 c_2^* - c_2 r_1^*} \quad (7)$$

where $$c_1 = \sum_{i=1}^{M}\left(|\hat{A}_{k_i}|^2 + |\hat{A}_{-k_i}|^2\right), \quad (8)$$

$$c_2 = 2\sum_{i=1}^{M} \hat{A}_{k_i}\hat{A}_{-k_i}, \quad (9)$$

$$r_1 = \sum_{i=1}^{M}\left(Z_{k_i}\hat{A}_{-k_i} + Z_{-k_i}\hat{A}_{k_i}\right), \text{ and} \quad (10)$$

$$r_2 = \sum_{i=1}^{M}\left(Z_{k_i}\hat{A}_{k_i}^* + Z_{-k_i}\hat{A}_{-k_i}^*\right). \quad (11)$$

The most likely estimates $\Lambda_{o,ML}$ and $\alpha_{ML}$ are in fact here derived from a maximum likelihood estimation expression:

$$\Lambda_0^{min}, \alpha\left[\sum_{i=1}^{M}\left[|Z_{ki} - \Lambda_o A_{ki} - \Lambda_o^* \alpha A_{-ki}^*|^2 + |Z_{-ki} - \Lambda_o A_{-ki} - _{k1}\Lambda_o^* \alpha A_{ki}^*|^2\right]\right],$$

based on a likelihood function for equation (5) listed above for pilot subcarriers at $\pm k_1, \ldots, \pm k_M$, distributed according to multi dimensional Gaussian distribution. To find $\Lambda_{o,ML}$ and $\alpha_{ML}$ from this expression, this expression is differentiated with respect to $\alpha$ and $\Lambda_0$, the results are set to 0 and solved for these variables.

With $\alpha$ML for the current OFDM symbol obtained, the I/Q gain and phase imbalance are estimated by the $$\epsilon_{ML} = 2\Re(\alpha_{ML}) \quad (13)$$

$$\theta_{ML} = 2\Im(\alpha_{ML}) \quad (14)$$

Let In, Qn denote the I and Q components of the output of the analog to digital converter, namely ADC 210 in FIG. 2 which define the nth OFDM symbol in the inbound PLCP frame. The I/Q imbalance is compensated by the I/Q imbalance compensation unit 220 by forming $\tilde{I}_n, \tilde{Q}_n$ where $$\tilde{I}_n = \left(1 - \frac{\varepsilon_{ML,n-1}}{2}\right)I_n + \frac{\theta_{ML,n-1}}{2}Q_n \quad (15)$$

$$\tilde{Q}_n = \frac{\theta_{ML,n-1}}{2}I_n + \left(1 + \frac{\varepsilon_{ML,n-1}}{2}\right)Q_n \quad (16)$$

Thus, in this embodiment, the values for $\epsilon_{ML}$ and $\theta_{ML}$ for the previous symbol (n−1) are used to compensate the I/Q imbalance in the nth or succeeding OFDM symbol. In turn, the imbalance compensated signal components $\tilde{I}_n, \tilde{Q}_n$ are provided to the input of the FFT 230 to improve symbol demodulation performance, and ultimately OFDM receiver performance.

Though not shown in FIG. 2, in an alternative embodiment, historical analysis of $\alpha$ML may be used to compensate the I/Q components, including use of averaged $\epsilon$ML and $\theta$ML values over a particular relative (e.g. within a current PLCP frame) or absolute (e.g. preceding 10 μsec) period of time.

In the embodiment shown in FIG. 2, the channel estimates $\hat{H}_k$ are compensated for the common phase error by the e.g. channel estimate compensation unit 245 (FIG. 2) as follows:

$$\tilde{H}_k = \Lambda_{o,ML}\hat{H}_k; \hat{H}_k = \tilde{H}_k \quad (12)$$

In other words, the channel estimate for demodulating next OFDM symbol is the CPE compensated version of the channel estimates for the present OFDM symbol, with $H_{kINIT}$ (or the initial channel estimates) being used for the first OFDM symbol in the received PLCP frame. In an alternative embodiment, also not shown in FIG. 2, historical analysis of $\Lambda_{0,ML}$ may be employed for common phase error compensation, similarly to $\alpha_{ML}$ previously discussed.

Figure 3:
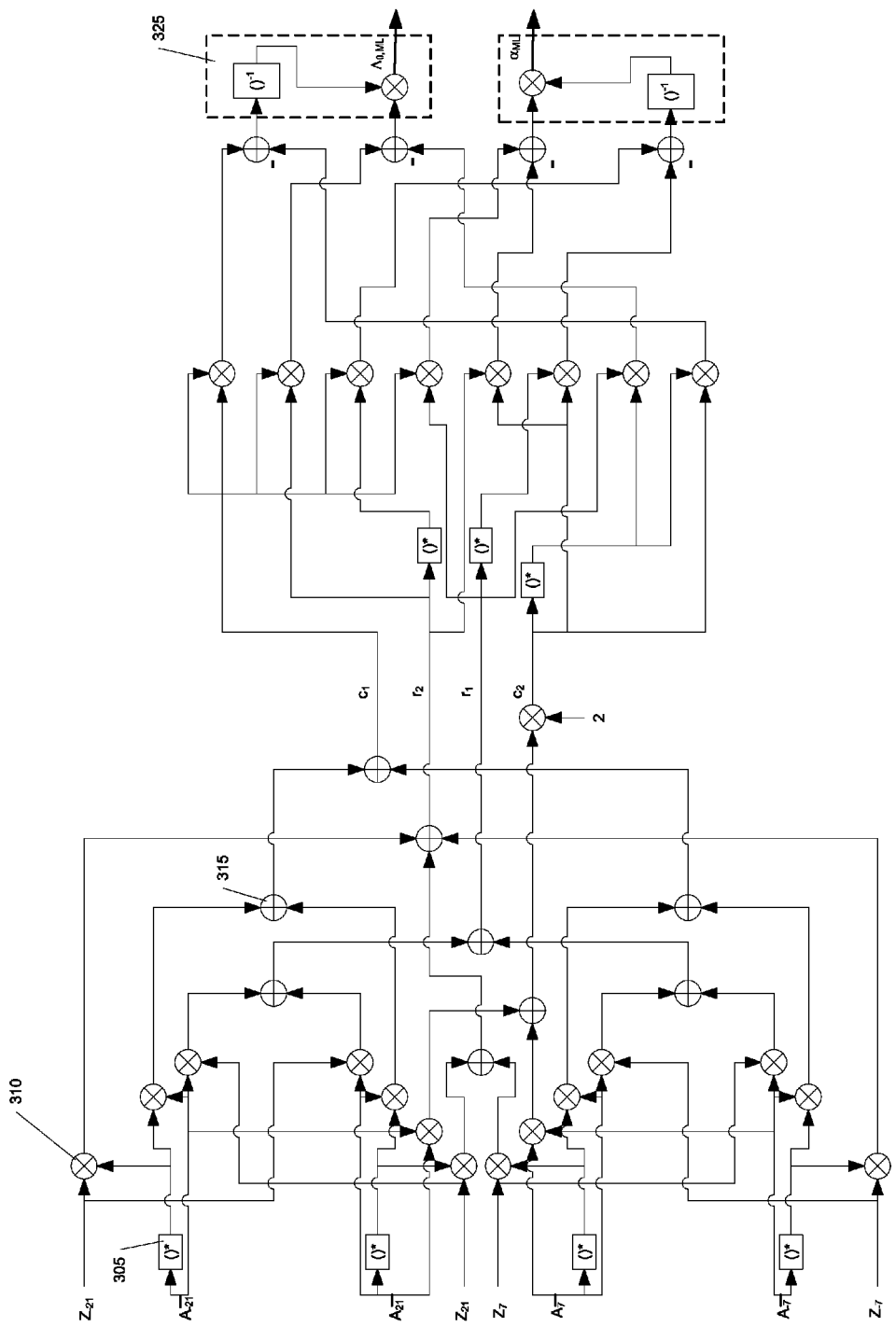
FIG. 3 is a calculation flow diagram for obtaining maximum likelihood estimates of the common phase error and I/Q imbalance consistent with the baseband processing unit shown in FIG. 2.

FIG. 3 illustrates a calculation flow diagram for obtaining $\alpha$ML, $\Lambda$0,ML for the four pilot subcarriers in the IEEE 802.11a/g standards consistent with the embodiment shown in FIG. 2. In particular this calculation flow diagram represents the implementation of equations (6)-(11) undertaken by the common phase error and I/Q imbalance calculation unit 240 in terms of complex convolution 305, multiplier 310, adder 315, subtractor 320, and division 325 units. It should be understood that FIG. 3 merely illustrates certain calculations and is not a particularized hardware schematic, in whole or in part, of the common phase error and I/Q imbalance calculation unit 240. In fact, the illustrated calculations can be conveniently implemented in a variety of ways, as would be understood by those skilled in the art, including programmable hardware, e.g. a DSP or microprocessor core with appropriate embedded software, or dedicated custom hardware, such as provided by discrete logic and/or an ASIC, could be used in whole or in part to provide the desired functionality. As such, various arrangements consistent with the calculation flow diagram of FIG. 3 or equations (6)-(11) may be used without departing from the scope of the present invention.

Figure 6:
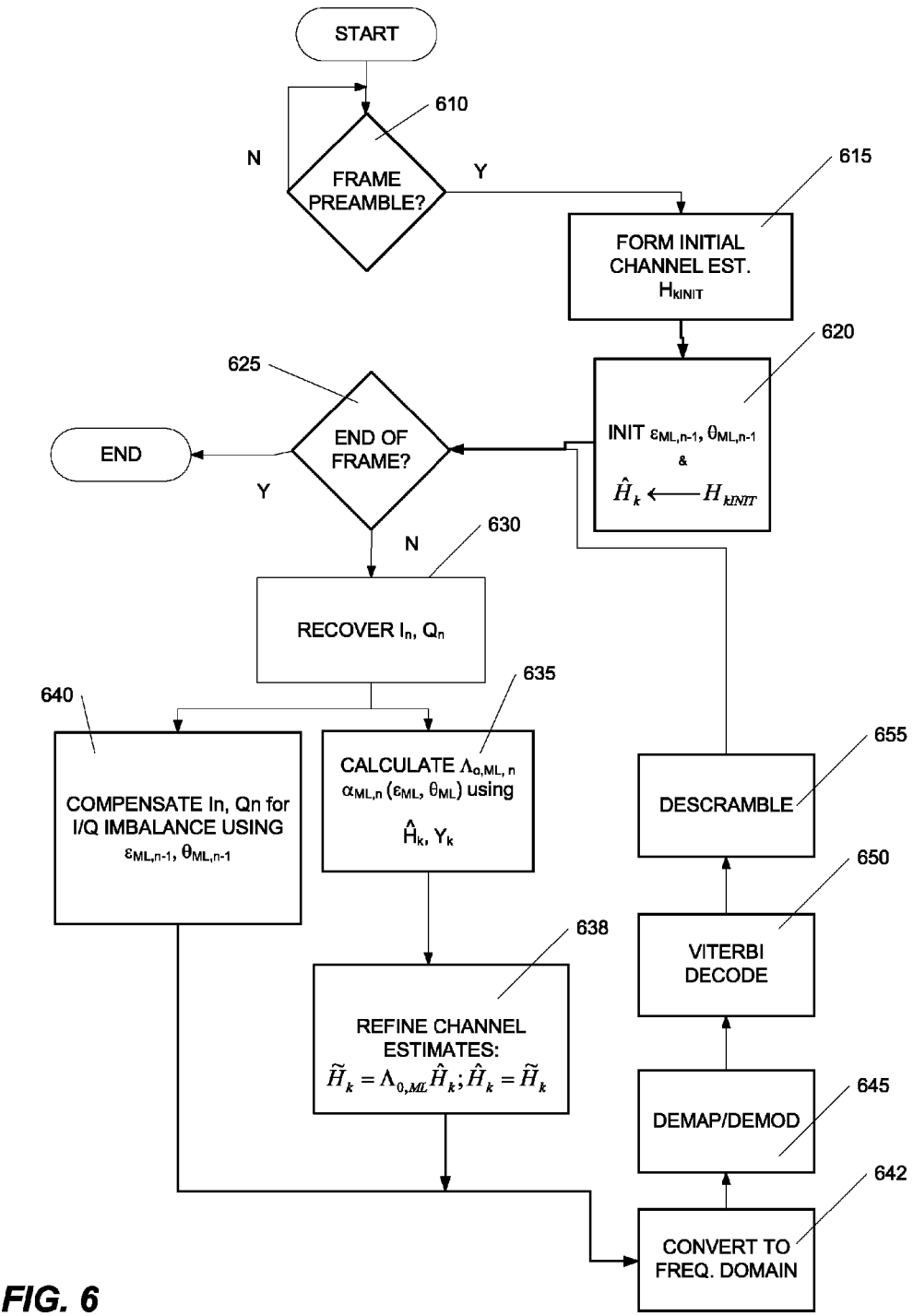
FIG. 6 is a flowchart illustrating I/Q imbalance compensation and adaptive channel estimate refinement according to another embodiment of the invention.

FIG. 6 illustrates I/Q imbalance and common phase error compensation according to an alternative embodiment of the invention. In this embodiment, processing begins at step 610 when the beginning of a new PLCP frame is recognized. During the preamble (result of query 610 is yes) of this frame, the initial channel estimates HkINIT are formed from the pilot subcarriers based on known preamble information consistent with 802.11a/g standards (step 615), and the channel estimates $\hat{H}_k$ and $\epsilon$ML and $\theta$ML are initialized. Then, until the end of the current frame is reached (step 625), the I/Q components for the current OFDM symbol in the frame are recovered (step (630), compensated for I/Q imbalance based on $\epsilon$ML and $\theta$ML calculated with reference to the previous symbol (or initial values if at the beginning symbol of the header or payload) (step 640) whilst the current $\Lambda$0,ML and $\alpha$ML, values are calculated (step 635), and the channel estimates are updated (step 638). Thereafter, as shown in FIG. 6, the I/Q imbalance compensated I and Q components obtained in step 640 are then converted into the frequency domain (step 642), demapped from the constellation (step 645), Viterbi decoded step 650), and descrambled (step 655) as is known in the art. Note that one or more of the illustrated processing steps shown in the flowchart of FIG. 6 may be carried out by discrete or combinational logic, as well as through an information processor, such as a general perpose microprocessor or microcontroller, or a specific-purpose processor such as a digital signal processor programmed in accordance with the functions and general sequence so described. Of course, any variety and combination of logic and/or instruction programming consistent with FIG. 6 may be used, such as the substitution of any functionally equivalent steps or inclusion of additional steps or operations, without departing from the scope of the present invention.

In a further alternative embodiment, maximum likelihood estimates for I/Q imbalance can be calculated without regard to phase noise or residual frequency offset effects, as was previously described. In such case, $\alpha$ML reduces to:

$$\alpha_{ML} = \frac{\sum_{i=1}^{M} \left[(Z_{k_i} - \hat{A}_{k_i})\hat{A}_{-k_i} + (Z_{-k_i} - \hat{A}_{-k_i})\hat{A}_{k_i}\right]}{\sum_{i=1}^{M} \left[|\hat{A}_{-k_i}|^2 + |\hat{A}_{k_i}|^2\right]}, \quad (17)$$

where $\hat{A}_k = \hat{H}_k X_k | N$. Here, the common phase error $\square_{o,\,ML}$ is deemed to be negligible and so no adaptive compensation of the channel estimates accounting for $\square_{o,\,ML}$ need occur. In comparison to the previously described embodiments, this results in a less complex I/Q imbalance calculation unit (which only needs to calculate $\square_{ML}$ per equation (17), as well as $\square_{ML}$ and $\square_{ML}$ in light thereof, as presented in equations (13) and (14) if, for example, an I/Q imbalance compensation unit such as unit 220 (FIG. 2) is employed. However, this potentially result in reduced receiver performance in comparison with previously described embodiments, particularly where effective data throughput approaches 802.11a/g maximum rates or orthogonality of the sub-carriers is substantially comprised by ambient noise.

It will be obvious to those having skill in the art that many changes may be made to the details of the above-described embodiments of this invention without departing from the underlying principles thereof. For example, although the above-described embodiments are directed to 802.11a/g transceiver-receiver implementations, the teachings of the present invention are not meant to be so limited. In fact, the above described I/Q imbalance, residual frequency offset and phase noise compensation techniques can be easily extended to other multicarrier OFDM systems, including those compliant with IEEE 802.16a. The scope of the present invention should, therefore, be determined only by the following claims.

What is claimed is:
1. A receiver comprising:
a radio frequency receive unit configured to downconvert an analog radio frequency signal into an analog baseband signal;
an in-phase and quadrature-phase detector configured to recover an analog in-phase signal and an analog quadrature signal from the analog baseband signal;
an analog-to-digital converter configured to
convert the analog in-phase signal into a corresponding digital in-phase signal, and
convert the analog quadrature signal into a corresponding digital quadrature signal;
an in-phase and quadrature-phase compensation unit configured to compensate the digital in-phase signal and the digital quadrature signal for any imbalance between the digital in-phase signal and the digital quadrature signal;
a fast Fourier transform module configured to convert the compensated digital in-phase signal and the compensated digital quadrature signal into a frequency domain digital Orthogonal Frequency Division Multiplexing (OFDM) symbol;
a channel estimator configured to generate a plurality of channel estimates, wherein each channel estimate corresponds to an estimate of the channel for a corresponding sub-carrier of the frequency domain digital Orthogonal Frequency Division Multiplexing (OFDM) symbol; and
a phase error and in-phase and quadrature-phase imbalance module configured to generate (i) a most likely estimate of the imbalance between the digital in-phase signal and the digital quadrature signal and (ii) a most likely estimate of a common phase error in the plurality of channel estimates,
wherein (i) the most likely estimate of the imbalance between the digital in-phase signal and the digital quadrature signal is used to compensate the digital in-phase signal and the digital quadrature signal, and (ii) the most likely estimate of the common phase error is used to compensate the plurality of channel estimates.

2. The receiver of claim 1, further comprising:
a demodulator configured to generate a plurality of demodulated symbols based, at least in part on, the plurality of channel estimates,
wherein each demodulated symbol corresponding to a given sub-carrier of the frequency domain digital Orthogonal Frequency Division Multiplexing (OFDM) symbol.

3. The receiver of claim 2, further comprising a Viterbi detector configured to perform a soft-decision decoding on each demodulated symbol and generate a corresponding soft-decision decoded symbol, wherein the soft-decision decoding of each demodulated symbol is based, at least in part, on the estimate of the channel corresponding to the given sub-carrier associated with the demodulated symbol.

4. The receiver of claim 1, wherein the receiver comprises a Maximum Ratio Combining receiver.

5. A network apparatus comprising the receiver of claim 1.

6. The network apparatus of claim 5, wherein the network apparatus comprises one or more of a PC card, a network interface card, or a wireless communications access point.

7. A method comprising:
downconverting an analog radio frequency signal into an analog baseband signal, the analog radio frequency signal having been transmitted over a channel;
recovering an analog in-phase signal and an analog quadrature signal from the analog baseband signal;
converting the analog in-phase signal into a corresponding digital in-phase signal;
converting the analog quadrature signal into a corresponding digital quadrature signal;
compensating the digital in-phase signal and the digital quadrature signal for any imbalance between the digital in-phase signal and the digital quadrature signal;
converting the compensated digital in-phase signal and the compensated digital quadrature signal into a frequency domain digital Orthogonal Frequency Division Multiplexing (OFDM) symbol;
generating a plurality of channel estimates, wherein each channel estimate corresponds to an estimate of the channel for a corresponding sub-carrier of the frequency domain digital Orthogonal Frequency Division Multiplexing (OFDM) symbol; and
generating (i) a most likely estimate of the imbalance between the digital in-phase signal and the digital quadrature signal and (ii) a most likely estimate of a common phase error in the plurality of channel estimates,
wherein (i) the most likely estimate of the imbalance between the digital in-phase signal and the digital quadrature signal is used to compensate the digital in-phase signal and the digital quadrature signal, and (ii) the most likely estimate of the common phase error is used to compensate the plurality of channel estimates.

8. The method of claim 7, further comprising:
generating a plurality of demodulated symbols based, at least in part on, the plurality of channel estimates,
wherein each demodulated symbol corresponding to a given sub-carrier of the frequency domain digital Orthogonal Frequency Division Multiplexing (OFDM) symbol.

9. The method of claim 8, further comprising:
performing a soft-decision decoding on each demodulated symbol and generating a corresponding soft-decision decoded symbol,
wherein the soft-decision decoding of each demodulated symbol is based, at least in part, on the estimate of the channel corresponding to the given sub-carrier associated with the demodulated symbol.

* * * * *